J. F. WATSON.
PROTECTIVE ARRANGEMENT FOR ELECTRICAL SYSTEMS.
APPLICATION FILED NOV. 24, 1915.

1,256,960.

Patented Feb. 19, 1918.
4 SHEETS—SHEET 1.

Inventor.
John Francis Watson
By Townsend & Decker
Attorneys

J. F. WATSON.
PROTECTIVE ARRANGEMENT FOR ELECTRICAL SYSTEMS.
APPLICATION FILED NOV. 24, 1915.
1,256,960.
Patented Feb. 19, 1918.
4 SHEETS—SHEET 2.
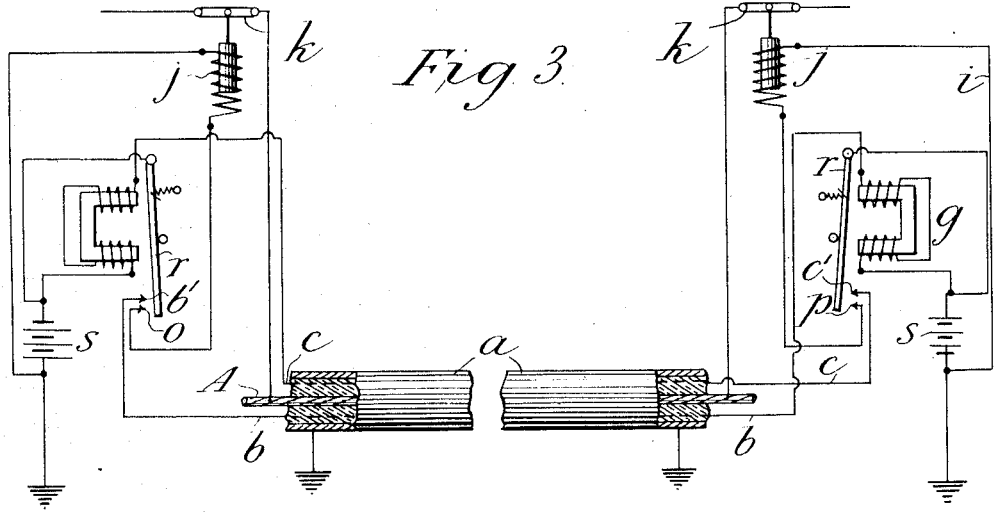
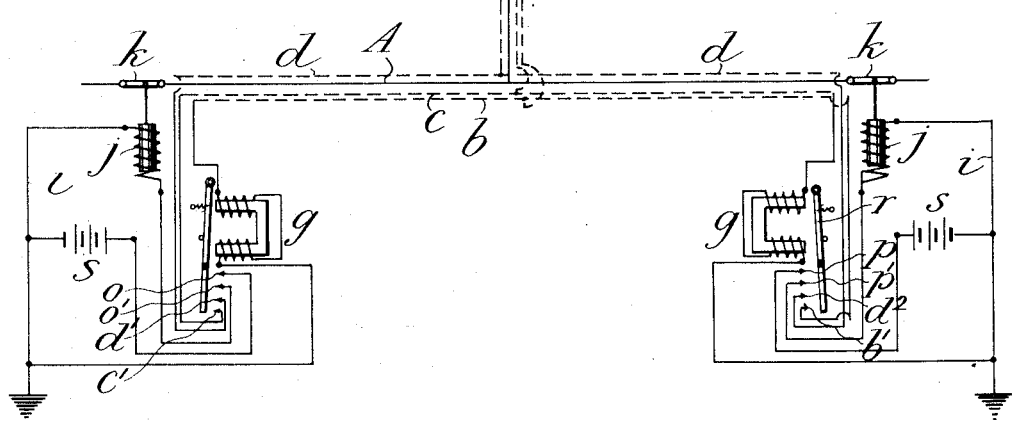
Inventor
John Francis Watson
By Townsend & Weber
Attorneys

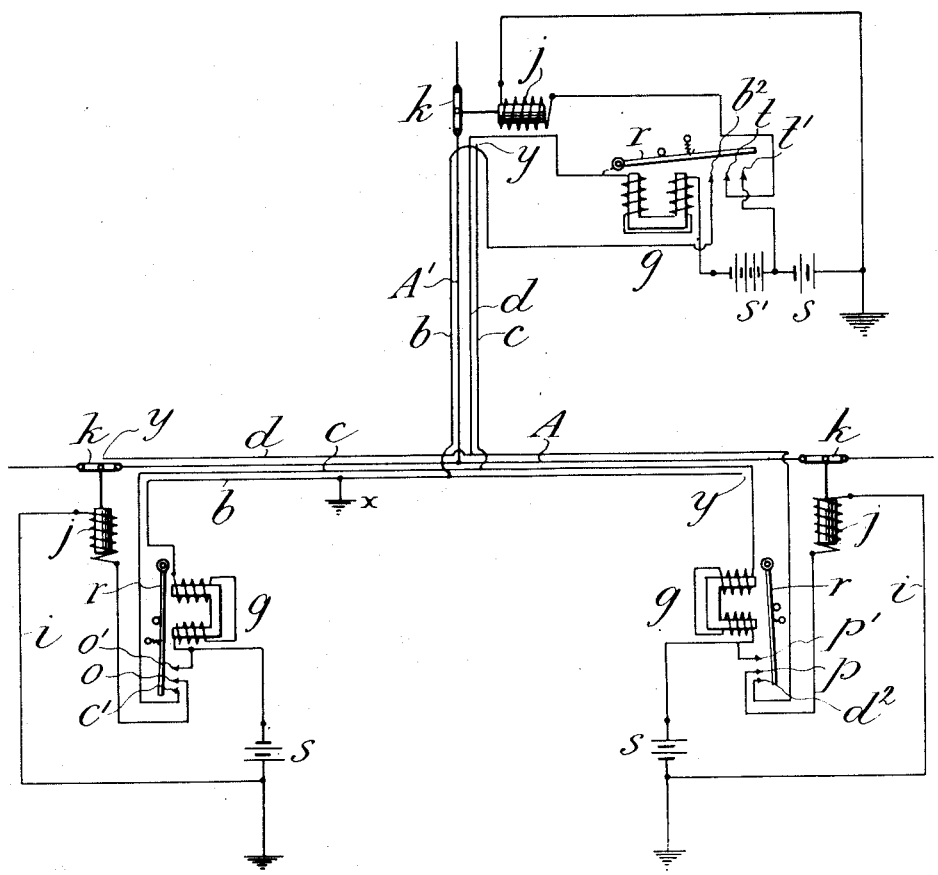

UNITED STATES PATENT OFFICE.

JOHN FRANCIS WATSON, OF BLACKHEATH, ENGLAND, ASSIGNOR TO HIMSELF, ERIC GORDON WATERS, OF SUSSEX, ENGLAND, AND CALLENDER'S CABLE & CONSTRUCTION COMPANY LIMITED, OF LONDON, ENGLAND.

PROTECTIVE ARRANGEMENT FOR ELECTRICAL SYSTEMS.

1,256,960.  Specification of Letters Patent.  Patented Feb. 19, 1918.

Application filed November 24, 1915. Serial No. 63,199.

*To all whom it may concern:*

Be it known that I, JOHN FRANCIS WATSON, a subject of the King of Great Britain and Ireland, residing at Blackheath, in the county of Kent, England, have invented Improvements Relating to Protective Arrangements for Electrical Systems, of which the following is a specification.

The present invention has for its object to provide for the effective protection of electric systems where, upon a fault occurring, it is necessary or desirable to simultaneously operate switches located at different places to cut out a cable or section of cable. For this purpose the invention consists of an arrangement of pilot or protective conductors and relays so interconnected or associated with one another that while normally there is no complete circuit through any of the protective conductors, current derived by one conductor from the system through leakage which virtually establishes the circuit of a companion relay controlling a switch at one place, will, through such relay, cause current to be conducted to the conductor or conductors of another relay or relays controlling a switch or switches at a distant point or points.

Protection of this character is particularly applicable to cables of ring main systems where it is desired to cut out, discriminately, faulty from healthy sections.

The invention can be carried into effect in various ways, as will be apparent from the examples diagrammatically illustrated in Figures 1 to 6 inclusive of the accompanying drawings each of which shows a separate arrangement to be hereinafter described.

Figure 1:
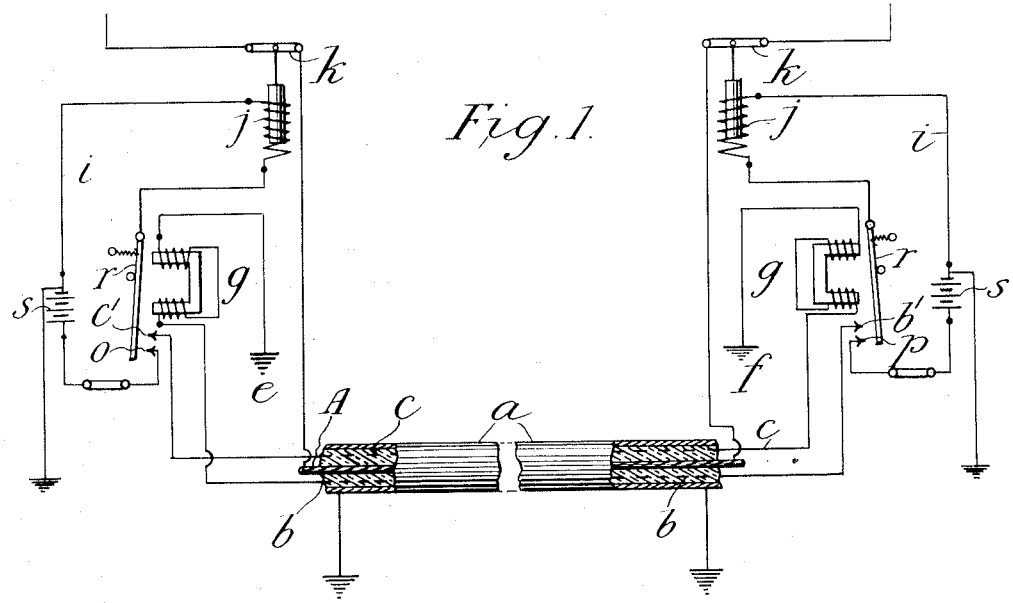

According to the arrangement shown in Fig. 1, the cable exemplified as sheathed with metal $a$ appropriately earthed although such sheathing is not necessary, is constructed with say two protective conductors $b$ and $c$ which may be referred to as earth shields that are insulated one from the other and from the sheath $a$ of the cable when employed and are in the form say of tape disposed in proximity to though insulated from the current carrying portion of the cable, exemplified as a single core A, one such tape, say $b$, being earthed at one end $c$ and the other tape, say $c$, earthed at the opposite end $f$ of the section and both including near such earthed ends, a relay $g$ of any suitable type adapted to complete, it may be, the local circuit $i$ of a trip coil $j$ pertaining to a cut out switch $k$. The remaining free end of the tapes $b$, $c$ may respectively be connected, as shown, to contacts $b^1$, $c^1$ so arranged that the movable element or armature $r$ of the relay $g$ of any one protective conductor $b$ or $c$ that may become alive will place the companion protective conductor $c$ or $b$ in electrical connection through the contact $c^1$ or $b^1$ and on adjacent contact $o$ or $p$ and armature $x$ with the local circuit $i$ controlled by such relay and which say include a battery $s$ having one pole earthed. In this way both relays $g$ are actuated by a fault current leaking from the cable core A to either conductor $b$ or $c$ to bring about the operation of the trip coils $j$ and cut out switches $k$.

Figure 2:
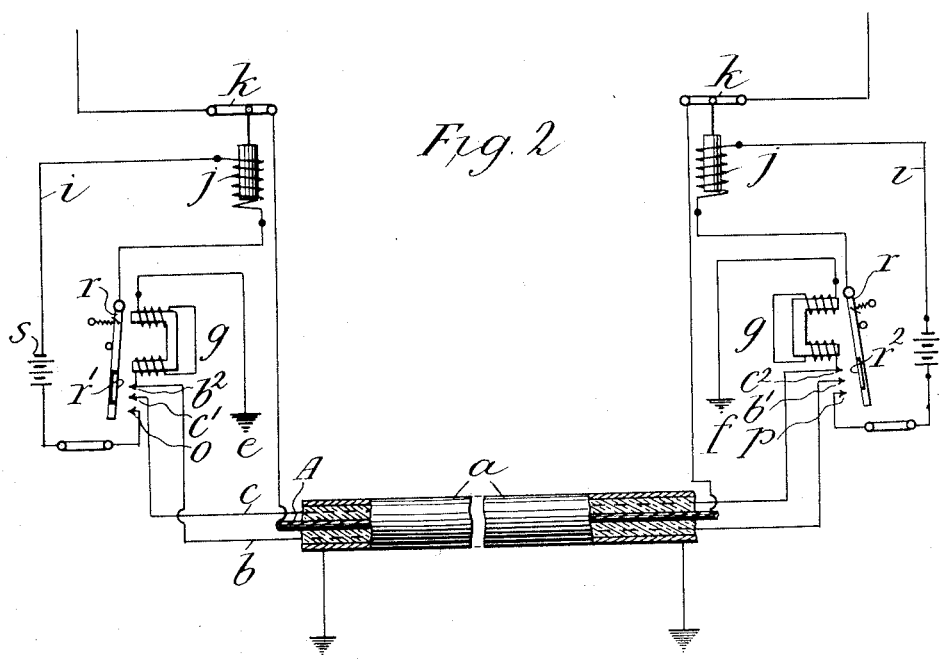

Or, as shown in Fig. 2, each relay $g$ when operated may be arranged to connect the companion conductors $b$, $c$ together so as to cause the relays to be connected in parallel. For this purpose the conductor $b$ is provided with an additional contact $b^2$ adjacent to the contacts $c^1$ and $o$ of one relay $g$ and the conductor $c$ is provided with an additional contact $c^2$ adjacent to the contacts $b^1$ and $o$ of the other relay, the contacts $c^1$, $c^2$ and $b^1$ $b^2$ being connected together by insulated bridge pieces $r^1$ and $r^2$, carried by the respective armatures $r$, when the said armatures are moved into the closed position. In this case the battery current is only made use of to energize the trip coil circuits $i$.

In the modified arrangement, shown in Fig. 3, each protective conductor $b$, $c$ is connected at one end to earth through a relay $g$ and battery which may, as shown, be the battery $s$ of the local trip circuit $i$, so that both relays $g$ will be influenced by a fault occurring between the protective conductors, or between either of them and earth, without there being necessarily a core fault. As in Fig. 1, the local circuit $i$ including the trip coil $j$, may be completed through the corresponding battery $s$ by the associated relay $g$ which at the same time connects the normally insulated adjacent end of the associated protective conductor to earth through the battery. In this arrangement if a fault occurs between the two protective conductors $b$, $c$ a circuit will be completed across the conductors and then through the relays $g$, batteries $c$ and earth, so that the relays will be operated at both ends of the cable section and the local circuits $i$ closed to operate the associated trip coils $j$ and cut out switches $k$. If a fault occurs between either of the protective conductors $b$, $c$ and earth a circuit will be completed through the associated relay $g$ and battery $s$ so as to operate the relay and bring about the operation of the second relay, as in Fig. 1, and the opening of both cut-out switches $k$.

When more than two protective conductors are used the relay of each conductor at one end of a section of cable is adapted to connect the normally insulated ends of the associated protective conductors at that end of the section to earth through the associated battery at that end in either of the arrangements described.

Such an arrangement responding only to a core fault, is shown in Fig. 4 where the core $A'$ of a branch cable section is T'd on to the core $A$ of a main cable section and embodies three protective conductors $b, c, d$. In this example the two ends of each of the batteries $s$ are connected respectively to two contacts $o$, $o^1$, $p$, $p^1$ and $t$, $t^1$ which are respectively arranged in proximity to contacts $c^1$, $d^1$ connected to conductors $c$, $d$, to contacts $b^1$ and $d^2$ connected to conductors $b$ and $d$ and to contacts $b^2$, $c^2$ connected to conductors $b$ and $c$. The function of the arrangement will be understood from the description already given of Fig. 1, with the following amplification. Whether the leakage to any protective conductor be from the core $A$ or the core $A^1$ the result is the same. Assuming the leakage to be to conductor $b$ then the fault current will proceed to earth by way of the winding of the lower left hand relay $g$. The consequent operation of this relay will complete the circuit of the associated battery $s$, so as to include the trip coil $j$, by way of contacts $o$, $o^1$. At the same time both the protective conduits $c$ and $d$ will be connected to the trip coil circuit between the positive pole of the battery $s$ and the coil $j$ through contacts $c^1$ $d^1$ so that, since the negative pole of such battery is connected to earth, and the end of conductor $c$ is permanently connected to earth through the winding of the lower right hand relay $g$ while the end of the conductor $d$ is similarly permanently connected to earth through the winding of the upper relay $g$, it follows that there is a simultaneous operation of both of these last mentioned relays immediately after the lower left hand relay is operated. Equivalently the same things happen when either of the other relays is first brought into action, the operation of the right hand relay, due to leakage from the core $A$ or $A^1$ to protective conductor $c$, resulting in completing circuits through protective conductors $b$ and $d$, while operation of the upper relay in the first instance, due to leakage to the protective conductor $d$, will result in completion of circuits through protective conductors $b$ and $c$.

In some cases where three cable ends are formed, each intended to be connected to a source of current and controlled by a relay in circuit with a protective conductor, such conductor may be connected to earth through a battery and the operation of one relay may be arranged to bring about the operation of one of the other relays which will in turn, in the manner described, bring about the operation of the third relay, two of the batteries having opposite poles connected to earth and the third battery having either pole connected to earth. In an arrangement of this kind there may be arranged in circuit with one of the relays and its protective conductor and battery, say that for the branch section of cable, a second battery arranged to assist the associated battery with the object of assisting all the relays to act together. The second battery may be so arranged that it will not be included in the associated local circuit containing the trip coil.

An arrangement of this character is shown in Fig. 5 where $s$ represents the batteries through which the protective conductors $b$, $c$ $d$ at the relay ends are connected to earth and $s^1$ is the additional battery associated with the relay of the branch cable conductor $A^1$. To enable the operation of this system to be understood let it be assumed that there is an earth fault upon the protective conductor $b$ at $x$, then the circuit of the winding of the left hand relay $g$ will be completed from the positive pole of the associated earthed battery $s$ through such fault. The relay will in consequence operate, move the armature $r$ and cause the normally free end $c^1$ of the protective conductor $c$ to be connected through contact $o^1$ to the relay circuit referred to at the negative side of the battery so that current can flow from the positive pole of the right hand earthed battery $s$ through the winding of the right hand relay $g$ to conductor $c$ and thence through contact $c^1$, armature $r$, contact $o^1$ and left hand battery $s$ to the negative pole of the right hand battery through earth. It will of course be understood that, as in the case of Fig. 4, the trip circuit $i$ associated with the left hand relay $g$, is completed through contacts $o$, $o^1$ and armature $r$. The operation of the right hand relay $g$ which thus follows operation of the left hand relay $g$, and results in closure of the lower right hand trip coil circuit $i$, will in turn, connect the normally free end $d^2$ of the protective conductor $d$ to the said right hand local trip coil circuit on the positive side of its battery *s* so that a circuit is completed through the winding of the upper relay *g* by way of the earthed positive pole of the companion batteries $s^1$ and *s* and the earthed negative pole of the battery *s* of the lower right hand relay. The upper relay *g* is thus operated to cause its armature *r* to close the circuit of the associated trip coil *j*. The three trip coils *j* are thus caused to act in succession to open the three cut out switches *k*. In this arrangement each conductor *b*, *c* or *d* has three ends one of which, viz. *y*, is at all times free.

In an analogous way a successive operation of the relays results when any conductor *b*, *c* or *d* is first brought into action as can be easily traced from the diagram.

The system is of course operative without the battery $s^1$ but it is convenient to employ it since it provides an assisting current at some stage in the operation, either at the end, at the commencement or intermediately.

Figure 6:
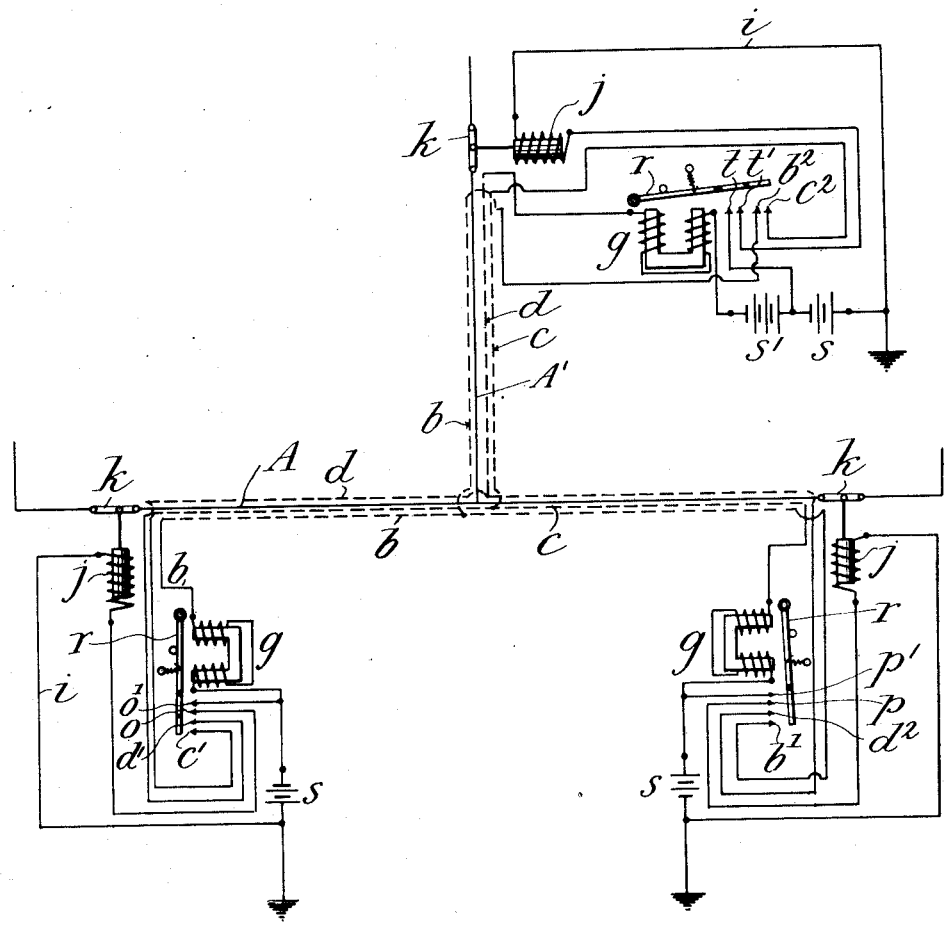

Fig. 6 is a diagram illustrating a modification of the connections which will enable the operation of any one relay *g* to bring the others into use so that such others operate simultaneously or practically so. In this case each conductor *b*, *c*, *d* is connected at one end to earth through a relay *g* and battery *s* and the relay at any such end is adapted to connect together the free ends of the companion conductors that extend to the region of this particular relay, by which means the remaining relays are connected in series with each other and with their batteries. For example, if the lower left hand relay *g* operates by reason of a fault from conductor *b* to earth, the ends $c^1$, $d^1$ of conductors *c*, *d* are coupled and current flows from the positive pole of the right hand lower earthed relay battery *s* through the associated relay and by way of the connected ends $c^1$, $d^1$ to the upper relay and batteries $s^1$, *s* to earth. The circuit for both the lower relays due to operation of the upper relay can be easily traced as can also the circuit for the upper and the lower left hand relay if in the latter case it be recognized that the sum of the voltages of the batteries *s* and $s^1$ at the upper relay is in excess of that of the battery *s* at the said lower relay so that in effect the latter may be considered as non-existent or as having its poles reversed.

Where a battery has been herein specifically referred to, it is to be understood that any other suitable source of electric energy may be employed.

The invention can be applied to systems in which protection is provided for as described in the specification of United States Letters Patent No. 1152362.

What I claim is:—

1. In an electrical system, the combination with a cable, of switches adapted to cut out the cable at distant points, protective conductors disposed along such cable between the switches and relay arrangements associated with the various switches, each such relay arrangement being connected to one end of a corresponding protective conductor and the several conductors being so separated that normally there is no complete circuit through any one thereof, current derived by one conductor from the system through leakage however virtually establishing the circuit of the companion relay which in addition to operating its switch will cause current to be conducted to the conductor of the relay controlling a distant switch.

2. In an electrical system, the combination with a cable, of switches adapted to cut out the cable at distant points, protective conductors disposed along such cable between the switches, relay arrangements associated with the various switches and earthed sources of current permanently connected each by one such relay to one end of a corresponding protective conductor, the operation of any one relay arrangement by leakage from one conductor to earth causing the circuit of a distant relay to be completed through the separate conductor companion thereto.

3. In an electrical system, the combination with a cable, of switches adapted to cut out the cable at distant points, protective conductors disposed along such cable between the switches and each having one end earthed and relay arrangements associated with the various switches, each such relay arrangement being included in a corresponding earthed conductor aforesaid and adapted when energized by leakage current, to complete the circuit of the distant relay included in a companion protective conductor.

4. In an electrical system, the combination with a cable, of switches adapted to cut out the cable at distant points, protective conductors disposed along such cable between the switches and each having one end earthed, relay arrangements associated with the various switches and earthed sources of current permanently connected each by one such relay to one end of a corresponding protective conductor and each such relay being adapted, when energized by leakage current, to complete the circuit of the distant relay included in a companion protective conductor.

5. In an electrical system, the combination with a T'd cable, of switches associated with the several ends thereof, T'd protective conductors disposed along such T'd cable between the switches and relay arrangements associated with the various switches, each relay being included in the branch of the corresponding T'd protective conductor appropriately earthed and adapted, when energized, to complete the circuit of another T'd protective conductor through a normally insulated end thereof in the vicinity of the relay referred to.

6. In an electrical system, the combination with a T'd cable of switches associated with the several ends thereof, T'd protective conductors disposed along such T'd cable between the switches, relay arrangements associated with the various switches and earthed sources of current permanently connected each by one such relay to one branch of a corresponding protective conductor, the operation of any one relay serving to complete the circuit of another T'd protective conductor through a normally insulated end thereof in the vicinity of the relay referred to.

7. In an electrical system, the combination with a T'd cable of switches associated with the several ends thereof, T'd protective conductors disposed along such T'd cable between the switches relay arrangements associated with the various switches, and earthed sources of current permanently connected each by one such relay to one branch of a corresponding protective conductor, the operation of any one relay serving to simultaneously complete the circuits of the remaining T'd protective conductors through normally insulated ends thereof in the vicinity of the relay referred to.

8. In an electrical system, the combination with a T'd cable of switches associated with the several ends thereof, three T'd protective conductors one branch of each being associated with a branch of a T'd cable, a relay associated with each switch and included in one branch of one of the T'd protective conductors, a battery associated with each relay through which said conductor branches are respectively earthed, two of the batteries having opposite poles connected to earth and the third battery having one pole so connected, and an assisting battery associated with one of said relay batteries, any single relay when energized serving to complete the circuit of another T'd protective conductor through a normally insulated end thereof in the vicinity of the relay referred to.

9. In an electrical system, the combination with a T'd cable of switches associated with the several ends thereof, three T'd protective conductors one branch of each being associaetd with a branch of the T'd cable, a relay associated with each switch and included in one branch of one of the T'd protective conductors, a battery associated with each relay through which said conductor branches are respectively earthed, two of the batteries having opposite poles connected to earth and the third battery having one pole so connected, and an assisting battery associated with one of said relay batteries, any single relay when energized serving to simultaneously complete the circuits of the remaining T'd protective conductors through normally insulated ends thereof in the vicinity of the relay referred to.

Signed at London, England, this tenth day of November 1915.

JOHN FRANCIS WATSON.

Witnesses:
FREDERICK WILLIAM GORDON BROUGHAM,
GEORGE BABINGTON PRICE.